Sept. 28, 1948. H. S. INDGE 2,450,237
ABRASIVE MACHINE
Filed March 8, 1946 3 Sheets-Sheet 1

Inventor
HERBERT S. INDGE
By George Crompton
Attorney

Sept. 28, 1948.  H. S. INDGE  2,450,237
ABRASIVE MACHINE
Filed March 8, 1946  3 Sheets-Sheet 2

Inventor
HERBERT S. INDGE

Sept. 28, 1948.

H. S. INDGE 2,450,237

ABRASIVE MACHINE

Filed March 8, 1946

Inventor

HERBERT S. INDGE

By George Crompton

Attorney

Patented Sept. 28, 1948

2,450,237

UNITED STATES PATENT OFFICE 2,450,237

ABRASIVE MACHINE

Herbert S. Indge, Westboro, Mass., assignor to Norton Company, Worcester, Mass., a corporation of Massachusetts Application March 8, 1946, Serial No. 652,974

13 Claims. (Cl. 51—58)

1

The invention relates to abrasive machines to grind the O. D. of cylinders and to produce a good finish thereon.

One object of the invention is to provide a machine which will remove some stock and leave a very fine mirror finish. Another object of the invention is to true up out of round cylinders and leave a very fine mirror finish. Another object of the invention is to provide a machine of the character indicated which can be quickly and easily loaded and unloaded.

Another object is to provide a machine which will grind and finish a great number of races simultaneously. Another object is to produce superior results in a mirror finish on cylindrical work pieces by breaking up the scratch marks by motions in several directions. Other objects will be in part obvious or in part pointed out hereinafter.

The invention accordingly consists in the features of construction, combinations of elements, and arrangements of parts all as will be illustratively described herein and the scope of the application of which will be indicated in the following claims.

In the accompanying drawings illustrating one of many possible embodiments of the mechanical features of this invention, Figure 1 is a plan view of the machine;

Figures 1, 2:
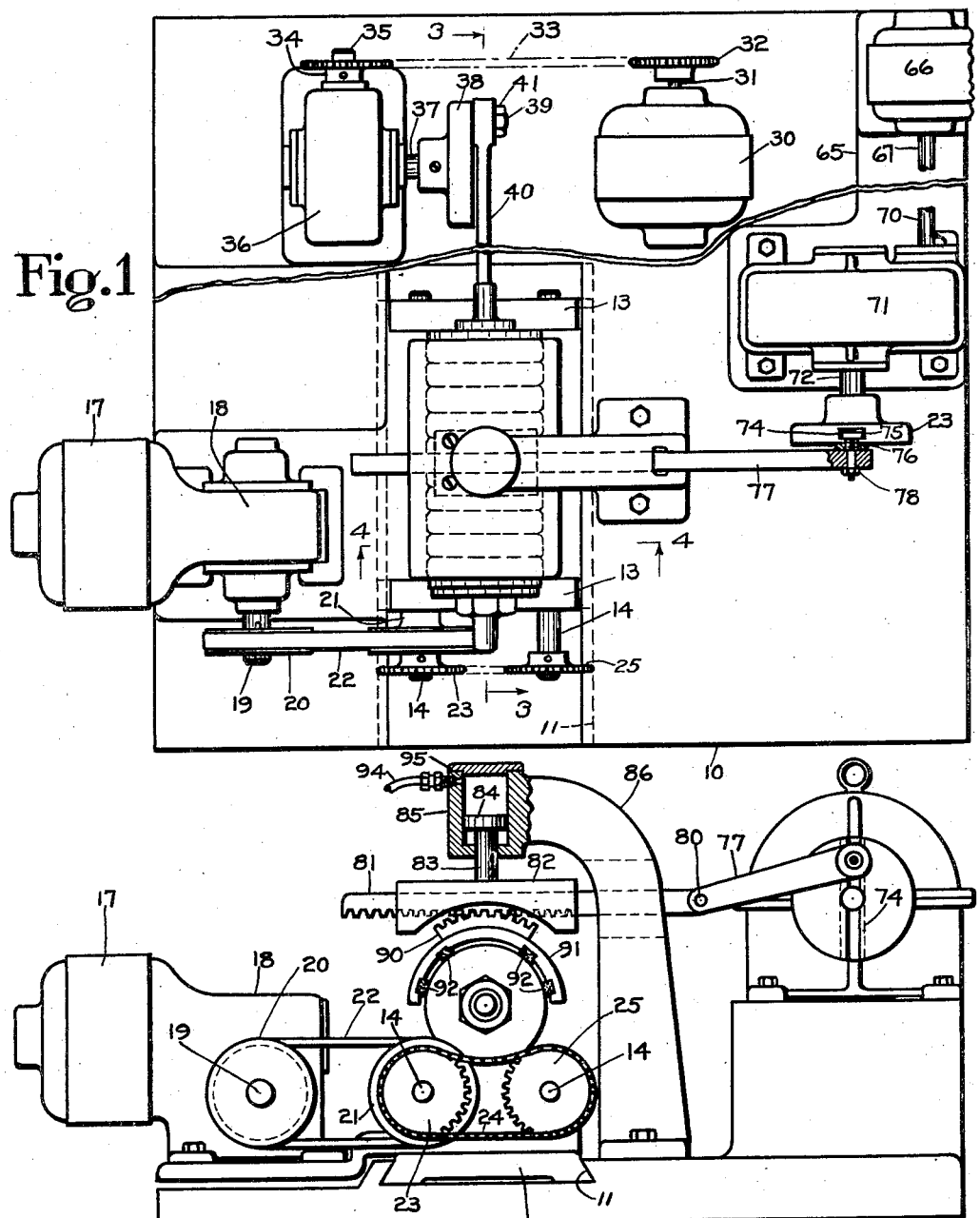
Figure 2 is an end view of the machine.

The machine can be constructed on any convenient base such as base 10 which for the most part is a flat plate. Constructed in the base 10 is a slide way 11 in which is mounted a slide 12. Uprising from the slide 12 at either end thereof are standards 13—13 in which are formed bearings for the trunnion shafts 14—14 of rollers 15—15 which have rubber coverings 16—16.

Also supported on the slide 12 is an electric motor 17 coupled by a reduction gearing 18 to a driven shaft 19 which is provided with a pulley 20. On one of the shafts 14 is mounted a pulley 21 and the pulleys 20 and 21 are connected by a belt 22. Next to the pulley 21 and also secured to the shaft 14 is a sprocket gear 23 which by means of a chain 24 drives a sprocket gear 25 that is fastened to the other shaft 14. Thus the

2 rubber covered rollers 15 are rotated in the same angular direction.

Mounted on the base 10 is a motor 30 upon the armature shaft 31 of which is a sprocket gear 32 which by means of a chain 33 drives the sprocket gear 34 on the drive shaft 35 of a speed reduction unit 36. The driven shaft 37 of the speed reduction unit 36 has attached to it a crank 38 in the form of a disc having a hub. Eccentrically mounted on the disc 38 is a stud 39 which constitutes the crank pin and on which is one end of a pitman 40 secured in place by means of a nut 41. The other end of the pitman 40 is connected to a bracket 42 by means of a pin 43 and the bracket 42 is secured to one of the standards 13. Thus, when the motor 30 is energized, the slide 12 is slowly reciprocated.

Figure 3:
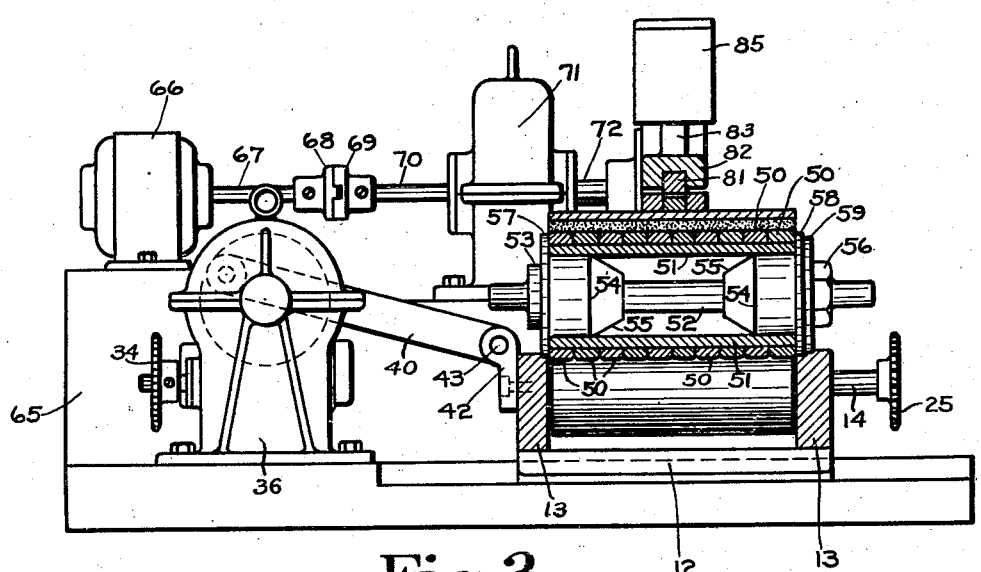
Figure 3 is a side elevation of the machine showing the work piece and certain portions of the machine in section taken along the line 3—3 of Figure 1.
Figure 4:
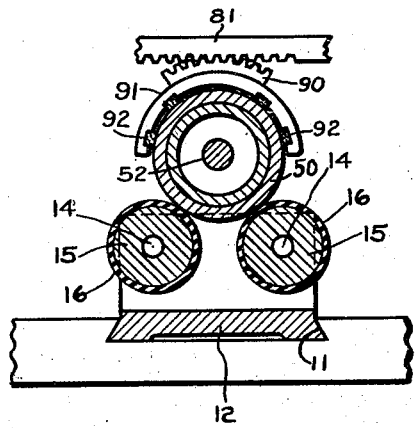
Figure 4 is a sectional view taken along the line 4—4 of Figure 1.

The machine is particularly adapted to grind and finish races for ball bearings or other similar rings. As best shown in Figure 3 a number of rings 50 are mounted on a sleeve 51 on which they fit accurately. The rings or races 50 are assumed to have been first finished on the inside at least to the extent of having accurate, smooth inner surfaces whether the inner race way has been formed or not. As shown in Figure 3 inside of the sleeve 51 is an arbor 52 with a head 53 at one end. On this arbor 52 are a pair of removable cylindrical members 54—54 which accurately fit the inside of sleeve 51. Preferably these members 54 have frusto-conical portions 55 so that they may readily be inserted into the sleeve 51. The end of the arbor 52 opposite the head 53 is screw threaded in part and a nut 56 is located thereon. Inside of the head 53 is a washer 57 and inside of the nut 56 are a pair of washers 58, 59. The washers 57 and 58 contact the end rings 50 and by tightening the nut 56 the rings 50 are secured firmly in place on the sleeve 51 and all of the parts associated with the arbor 52 are firmly held together. This assembly represents a plurality of work pieces all carefully located relative to their inside diameter and ready for grinding and polishing. However the work piece might be a single cylinder, either solid or hollow.

Formed upon the base 10 is a platform 65 which supports a motor 66 having an armature shaft 67 coupled by means of a coupling 68, 69 to a shaft 70 of a reduction gearing 71 the driven shaft 72 of which has attached to it a crank member 73. The crank member 73 is in the form of a disc with a hub and in the disc portion is a T slot 74. A headed stud 75 fits in the T slot and is secured therein in adjusted position by means of a nut 76.

A pitman 77 is mounted on the stud 75 and held in place by means of a nut 78 on a screw threaded end of the stud 75. The portion of the stud under the nut 76 is also screw threaded but the portion of the stud 75 under the pitman 77 is plain and ends in a shoulder so that the nut 78 will not bind the pitman. The other end of the pitman 77 is connected by means of a pin 80 to a reciprocating rack rod 81 which moves in a guide 82 connected by means of a piston rod 83 to a piston 84 in a cylinder 85 that is attached to the upper end of an overhanging bracket 86 secured to the base 10. Rack rod 81 meshes with a partial gear member 90 secured to the outside of a semi-cylindrical shell 91. Mounted on the inside of the shell 91 are a plurality of abrasive sticks 92, four being shown but a greater or lesser number might be provided. It will thus be seen that when the motor 66 is energized, the pitman 77 is slowly oscillated and this reciprocates the rack rod 81 which oscillates the shell 91. Pressure to grind or lap may be applied to the cylinder 85 by means of a pipe connection 94 and a port 95. The fluid may be pneumatic or hydraulic, that is to say it may be air or oil and it is contemplated that the pressure shall be adjustable.

The shell 91, guide 82 and associated parts may readily be lifted for the replacement of work pieces. In fact the machine can be loaded in an instant. It is found that the machine is capable of removing stock at a reasonable rate and produces truly cylindrical articles and with a very fine surface finish. Grinding lines are removed by the rectilinear reciprocation caused by the movement of the slide 12 while the oscillations of the shell 91 help to produce a good lapping action. The machine is thus in some aspects a grinding machine and in some aspects a lapping machine and thus removes stock and finishes in a single operation. Once the machine is started it requires no attention whatsoever. The work piece is slowly revolved by the rubber covered rollers 15 so that all parts thereof are ground and lapped.

An important feature of the invention is the relative motions involving slow rotation, slow oscillation of the lapping shell, and slow relative reciprocation in an axial direction. Furthermore a cast iron shell 91 without any abrasive sticks 92 but using loose abrasive is found to give good results in actual practice.

Figure 5:
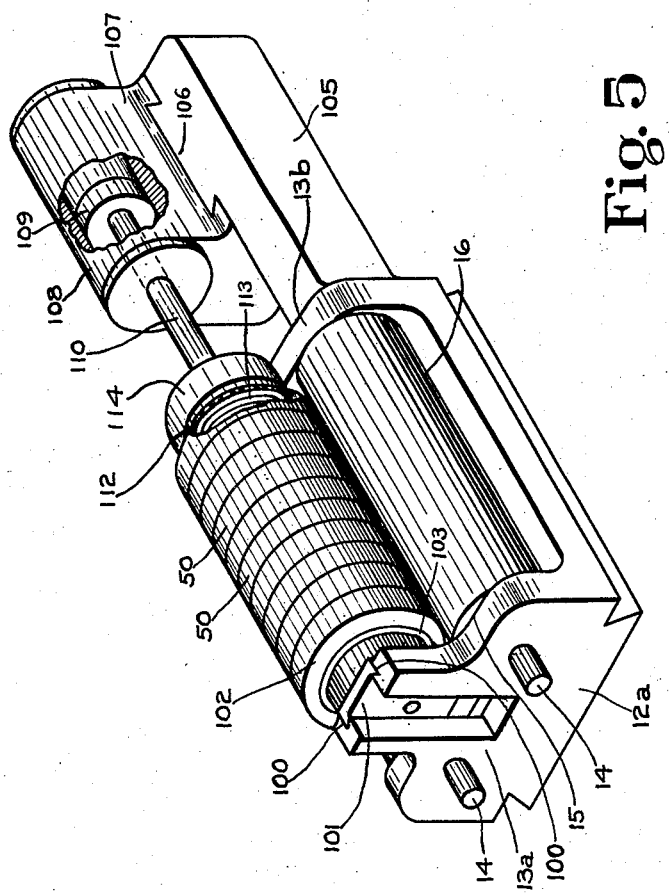
Figure 5 is a perspective view illustrating a modification of the invention.

Referring now to Figure 5, a modification of the invention is shown which eliminates the mounting of the work pieces on an arbor. A slide 12a has standards 13a, 13b mounting the trunnions 14—14 of rollers 15 having rubber coverings 16. The standard 13a has vertical ways 100 in which is mounted a slide 101. Secured to the inside of the slide 101 in any suitable manner is a thrust plate 102 which includes a thrust ball bearing and a rubber facing 103. That is to say, one end race of the ball bearings is fixed to the slide 101 while the other end race is rubber covered and is directly contacted by the work pieces 50. The other standard 13b has a horizontal extension 105 having a set of vertical ways 106 for a slide 107 which holds a cylinder 108 in which is a piston 109. The piston rod 110 is made coaxial with the work pieces by adjusting the vertical slide 107. A thrust plate 112 which may be just like the thrust plate 102 has one ball race attached to the front end of a head 114 of the piston 110, while the other race is covered with rubber 113. Work pieces 50 are now mounted between the thrust plates 102, 112 and pressure is applied in the cylinder 108 to urge the piston 109 to the left. This causes the work pieces 50 to be held in position while the shell 91 oscillates and the slide 12a reciprocates, for the remainder of the machine of the modification of Figure 5 is the same as previously described in the case of Figures 1 to 4. The particular advantage of the thrust plates and fluid pressure means is that work pieces can be loaded into the machine in a few seconds.

It will thus be seen that there has been provided by this invention a method and apparatus in which the various objects hereinabove set forth together with many thoroughly practical advantages are successfully achieved.

As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. In apparatus of the class described, a pair of rollers mounted on parallel axes adapted to rotate a work piece by frictional engagement therewith, means to rotate said rollers slowly in the same angular direction, a partial cylindrical shell whose axis is parallel to the axes of the rollers, means to press said shell against a work piece rotated by said rollers, means to cause a relative reciprocation between said shell and said rollers in a line parallel to the axes of the rollers and at a slow speed, and means slowly to oscillate said shell substantially about its own axis.

2. In apparatus as claimed in claim 1, the combination with the parts and features therein specified, of an adjustment for the means to oscillate the shell to vary the amplitude of the oscillation.

3. In apparatus of the class described, a pair of rollers mounted on parallel axes adapted to rotate a work piece by frictional engagement therewith, means to rotate said rollers slowly and in the same angular direction, a partial cylindrical shell whose axis is parallel to the axes of the rollers, means to press said shell against a work piece rotated by said rollers, and means slowly to oscillate said shell substantially about its own axis.

4. In apparatus as claimed in claim 1, the combination with the parts and features therein specified, of abrasive sticks on the under side of said shell parallel to the axis of the shell.

5. In apparatus of the class described, a pair of rollers mounted on parallel axes adapted to rotate a work piece by frictional engagement therewith, means to rotate said rollers slowly and in the same angular direction, a partial cylindrical shell whose axis is parallel to the axes of the rollers, means to press said shell against a work piece rotated by said rollers, means slowly to oscillate said shell substantially about its own axis, and abrasive sticks on the under side of said shell parallel to the axis of said shell.

6. In apparatus of the class described, a pair of rollers mounted on parallel axes adapted to rotate a work piece by frictional engagement therewith, means to rotate said rollers in the same angular direction, a partial cylindrical shell whose axis is parallel to the axis of the rollers, means to cause a relative reciprocation between said shell and said rollers in a line parallel to the axes of the rollers, and means to oscillate said shell substantially about its own axis.

7. In apparatus of the class described, a pair of rollers mounted on parallel axes adapted to rotate a work piece by frictional engagement therewith, means to rotate said rollers in the same angular direction, a partial cylindrical shell whose axis is parallel to the axis of the rollers, means to cause a relative reciprocation between said shell and said rollers in a line parallel to the axes of the rollers, and means to oscillate said shell substantially about its own axis, said means allowing said shell readily to be moved away from said rollers to permit replacement of work pieces.

8. In apparatus of the class described, a pair of rollers mounted on parallel axes adapted to rotate a work piece by frictional engagement therewith, means to rotate said rollers in the same angular direction, a partial cylindrical shell whose axis is parallel to the axis of the rollers, and means to oscillate said shell substantially about its own axis.

9. In apparatus of the class described, a pair of rollers mounted on parallel axes adapted to rotate a work piece by frictional engagement therewith, means to rotate said rollers in the same angular direction, a partial cylindrical shell whose axis is parallel to the axis of the rollers, and means to oscillate said shell substantially about its own axis, said means allowing said shell readily to be moved away from said rollers to permit replacement of work pieces.

10. In apparatus as claimed in claim 7, the combination with the parts and features therein specified, of a pair of thrust plates revolubly mounted to hold work pieces together which are on said rollers, and means to urge said thrust plates towards each other to hold said work pieces while acted upon by said cylindrical shell.

11. In apparatus as claimed in claim 8, the combination with the parts and features therein specified, of a pair of thrust plates revolubly mounted to hold work pieces together which are on said rollers, and means to urge said thrust plates towards each other to hold said work pieces while acted upon by said cylindrical shell.

12. In apparatus as claimed in claim 1, the combination with the parts and features therein specified, of a pair of thrust plates revolubly mounted to hold work pieces together which are on said rollers, and means to urge said thrust plates towards each other to hold said work pieces while acted upon by said cylindrical shell.

13. In apparatus of the class described, a roller to support round work pieces and to rotate them by frictional engagement, supporting means including journals for said roller, a pair of vertical slide ways connected to said supporting means said slide ways being non-parallel to the axis of said roller, a slide in each slide way, a pair of revoluble thrust plates one connected to each slide said thrust plates each having an axis which is perpendicular to the line of movement of its slide, and means urging one of said thrust plates towards the other of said thrust plates, whereby a plurality of otherwise disconnected round work pieces may be held axially between said thrust plates and rotated by said roller said slides permitting said work pieces frictionally to engage said roller.

HERBERT S. INDGE.

REFERENCES CITED

The following references are of record in the file of this patent:

UNITED STATES PATENTS

| Number | Name | Date |
|---|---|---|
| 1,227,775 | Friess | May 29, 1917 |
| 1,238,612 | Wilson | Aug. 28, 1917 |
| 2,195,049 | Wallace | Mar. 26, 1940 |
| 2,196,108 | Dunbar et al. | Apr. 2, 1940 |
| 2,258,037 | Storz | Oct. 7, 1941 |
| 2,398,022 | Marren | Apr. 9, 1946 |